(12) United States Patent
Hamm et al.

(10) Patent No.: US 11,566,701 B1
(45) Date of Patent: Jan. 31, 2023

(54) PROPPED CANTILEVER CARRIER

(71) Applicant: Bell Textron Inc., Fort Worth, TX (US)

(72) Inventors: Trenton A. Hamm, Cleburne, TX (US); Gregory A. Spruce, Grand Prairie, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/575,756

(22) Filed: Jan. 14, 2022

(51) Int. Cl.
*F16H 57/08* (2006.01)
*F16H 1/28* (2006.01)

(52) U.S. Cl.
CPC ............. *F16H 57/082* (2013.01); *F16H 1/28* (2013.01)

(58) Field of Classification Search
CPC ........ F16H 57/082; F16H 1/28; F16H 1/2809; F16H 2001/325
See application file for complete search history.

(56) References Cited

U.S. PATENT DOCUMENTS

| 8,550,957 | B2 | 10/2013 | Erno et al. | |
| 10,767,755 | B2* | 9/2020 | Nique | ..................... F16H 57/08 |
| 10,816,087 | B2* | 10/2020 | Nique | ..................... F16H 57/08 |
| 11,085,523 | B2* | 8/2021 | Nique | ................. F16H 57/0479 |

OTHER PUBLICATIONS

Carid.com, "ACDelco®—GM Original Equipment Transfer Case Planetary Carrier", downloaded from the Internet on Sep. 15, 2022, at https://www.carid.com/acdelco/gm-original-equipment-transfer-case-planetary-carrier.html, 4 pages.
Jonsson, Martin, "Planetary Gear Analysis—deformation induced misalignment and optimization", Master of Science Thesis TRITA-ITM-EX 2020:322 KTH Industrial Engineering Management Machine Design, Jun. 6, 2020, 73 pages, Stockholm, Sweden.

* cited by examiner

*Primary Examiner* — Tinh Dang
(74) *Attorney, Agent, or Firm* — Frost Brown Todd LLP

(57) ABSTRACT

A propped cantilever carrier is described that can be used in planetary gear systems. The carrier can comprise cantilevered arms extending outward from a central hub. At the end of each cantilever a post can extend downward that is configured to receive bearings and gears. A plate can comprise a hole for each post in the carrier. When the plate is coupled to the carrier it can hold the bearings and gears in place and provide added strength to the carrier. The strength benefits are large compared to the light weight of the carrier (with plate) apparatus.

20 Claims, 6 Drawing Sheets

PROPPED CANTILEVER CARRIER

TECHNICAL FIELD

The present disclosure is directed to planetary gearing systems.

BACKGROUND OF THE INVENTION

Planetary gear systems are used in many applications. Regarding vehicles, planetary gears are useful in transmissions. For a variety of vehicles (autos, airplanes, electric vehicles), machinery (such as windmills), and other applications requiring converting speed and torque, there is a need to convert a motor speed (e.g., revolutions per minute (RPM)) to a different speed, such as wheel RPM or blade RPM. Planetary gear systems commonly have a carrier, sun gear, planetary gears, and a ring gear. Two typical carrier designs are web-and-plate and cantilever.

BRIEF SUMMARY OF THE INVENTION

One embodiment under the present disclosure comprises a carrier for a planetary gearing system. The carrier can comprise a hub configured to transmit torque to a next component and comprising two or more cantilevers extending outward and downward from the hub. The carrier can further comprise a post extending downward from each of the two or more cantilevers, the post configured to receive one or more bearings and one or more planetary gears. It can further comprise a plate configured to couple to each post and to restrict the movement of the one or more bearings and the one or more planetary gears.

Another embodiment under the present disclosure comprises a planetary gear system. This system can comprise a carrier comprising; a hub configured to transmit torque to a next component and comprising two or more cantilevers extending outward and downward from the hub; two or more cantilevers extending outward and downward from the hub; one or more posts extending downward from the two or more cantilevers; and a plate configured to couple the one or more posts. The system can further comprise one or more bearings coupled to the one or more posts; and one or more planetary gears coupled to the one or more posts and sitting around the one or more bearings. The system can be characterized in that the plate is configured to sit adjacent to (or opposite the hub with respect to) the one or more planetary gears and to restrict the movement of the one or more planetary gears.

Another embodiment under the present disclosure comprises a method of manufacturing a carrier for a planetary gear system. The method can comprise providing a hub configured to transmit torque to one or more components and providing two or more cantilevers extending outward and downward from the hub. The method can further comprise providing a post extending downward from an end of each cantilever, the post configured to receive one or more bearings and one or more planetary gears; and providing a plate configured to engage each post and to restrict the movement of the one or more planetary gears.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
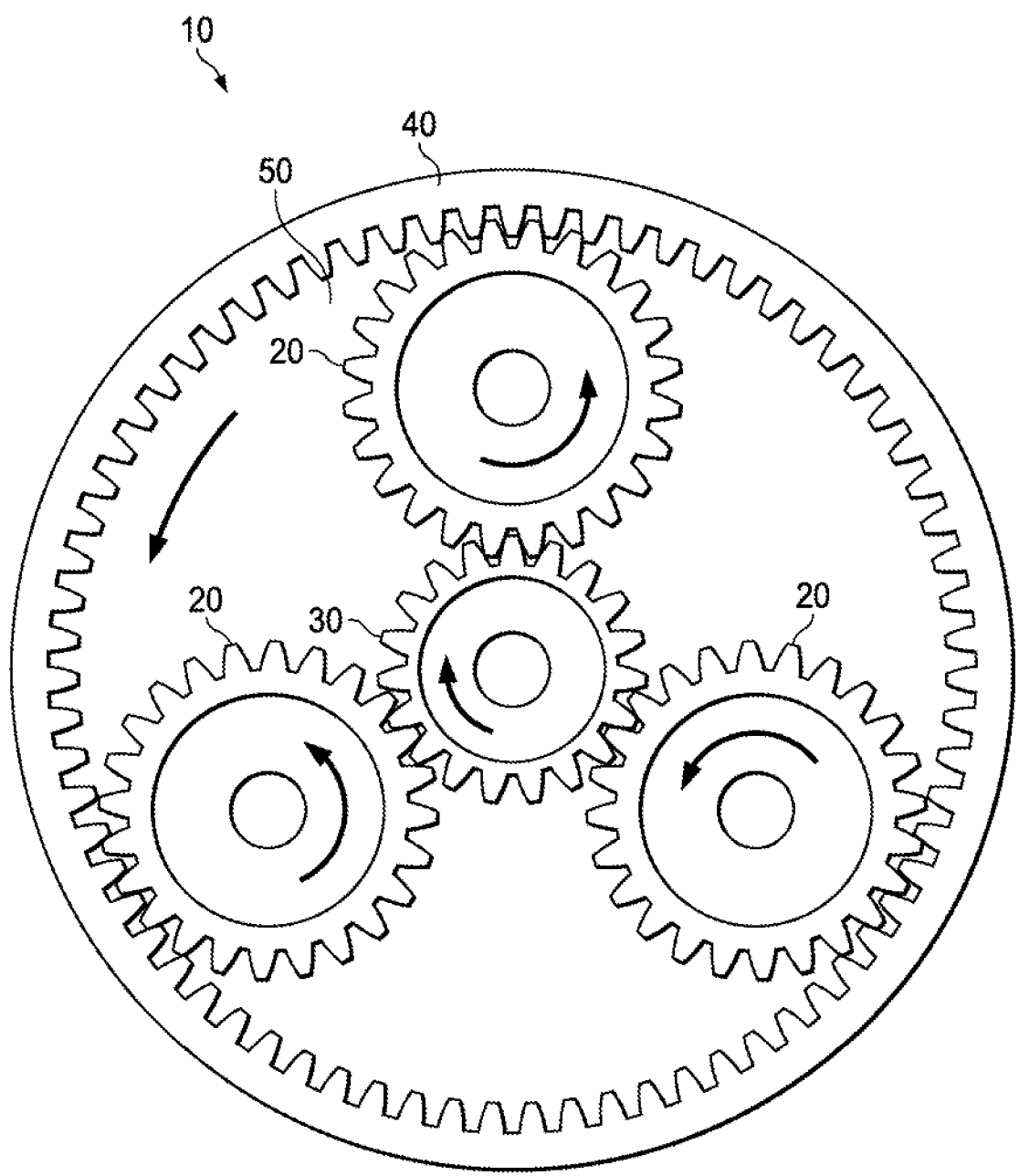
FIG. 1 is a diagram of a prior art planetary gear system.

Planetary gear systems, such as system 10 in FIG. 1, commonly have a sun gear 30, planetary gears 20, ring gear 40, and a carrier 50. In a common planetary system, the sun gear 30 can be spinning at a high RPM, such as the output of a gas motor. Using a planetary gear system 10, the motor speed, applied at the sun gear 30, can be reduced at an output. The output might be the carried by the carrier 50 that connects the planetary gears 20 together. This output will be at a lower RPM than the input at the sun gear 30. The output will also allow for greater torque, to assist in moving a car, for example. Multiple planetary gear systems can be combined together that are all concentric around a common axis. In this way a car transmission, for example, can take an RPM from a motor (that maybe quite high) and convert it to several different speeds with varying levels of torque. A seven-speed transmission for example.

Figure 2:
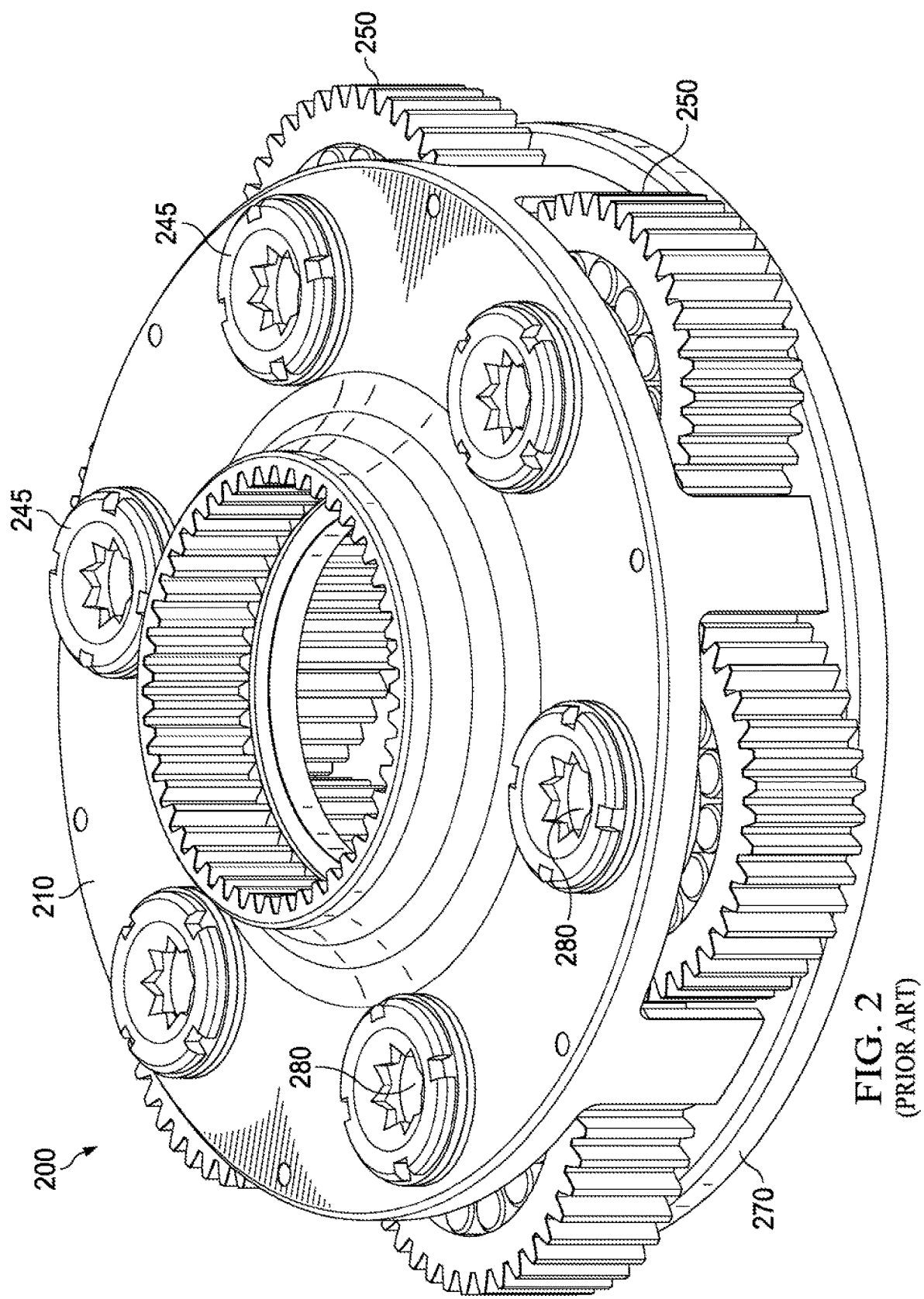
FIG. 2 is a diagram of a prior art carrier for a planetary gear system.

One drawback to planetary gear systems is the high torque loads that are created. The gears and supporting structures undergo large loads that may cause excessive deflections and/or failure. To add stiffness, strength, and resilience, two solutions that have been used are web-and-plate carriers and cantilever carriers, shown in FIGS. 2 and 3. In web-and-plate carrier 200, a web 210 can connect the planetary gears 250 together on one side (the top in this view). On the other side of the planetary gears 250 a plate 270 can be disposed to add further strength. Multiple posts 280 connect the web 210, plate 270 and planetary gears 250 together. Web 210 and post 280 are not integrated. Nut 245 holds the post 280 to web 210. Bearings or washers (not shown) can assist in holding post 280 in place with respect to plate 270 and web 210 while allowing the post 280 to rotate. One drawback to web-and-plate carriers 200 is their weight.

Figure 3:
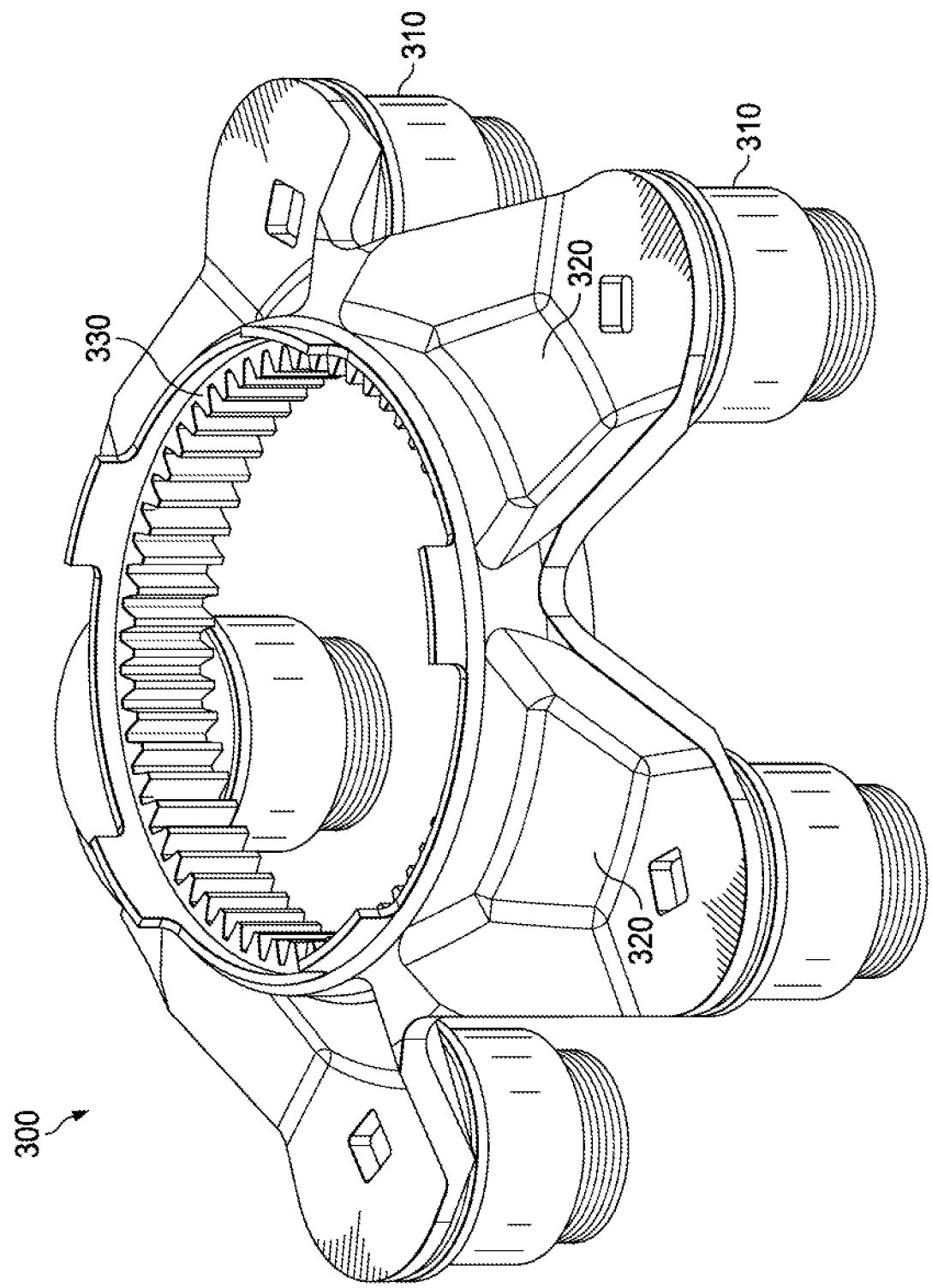
FIG. 3 is a diagram of a prior art carrier for a planetary gear system.

A cantilever carrier 300 is shown in FIG. 3. Cantilever carrier 300 is lighter weight than web-and-plate carrier 200 but has lower stiffness for similar strength. Posts 310 extend out from cantilevers 320, which are coupled to hub 330. Planetary gears can be coupled to posts 310.

Embodiments under the current disclosure include propped cantilever carriers that are lighter weight than web-and-plate carriers of the prior art, while maintaining better strength characteristics than cantilever carriers. Solutions described generally have fewer components and easier machining and construction than prior art solutions.

Figure 4:
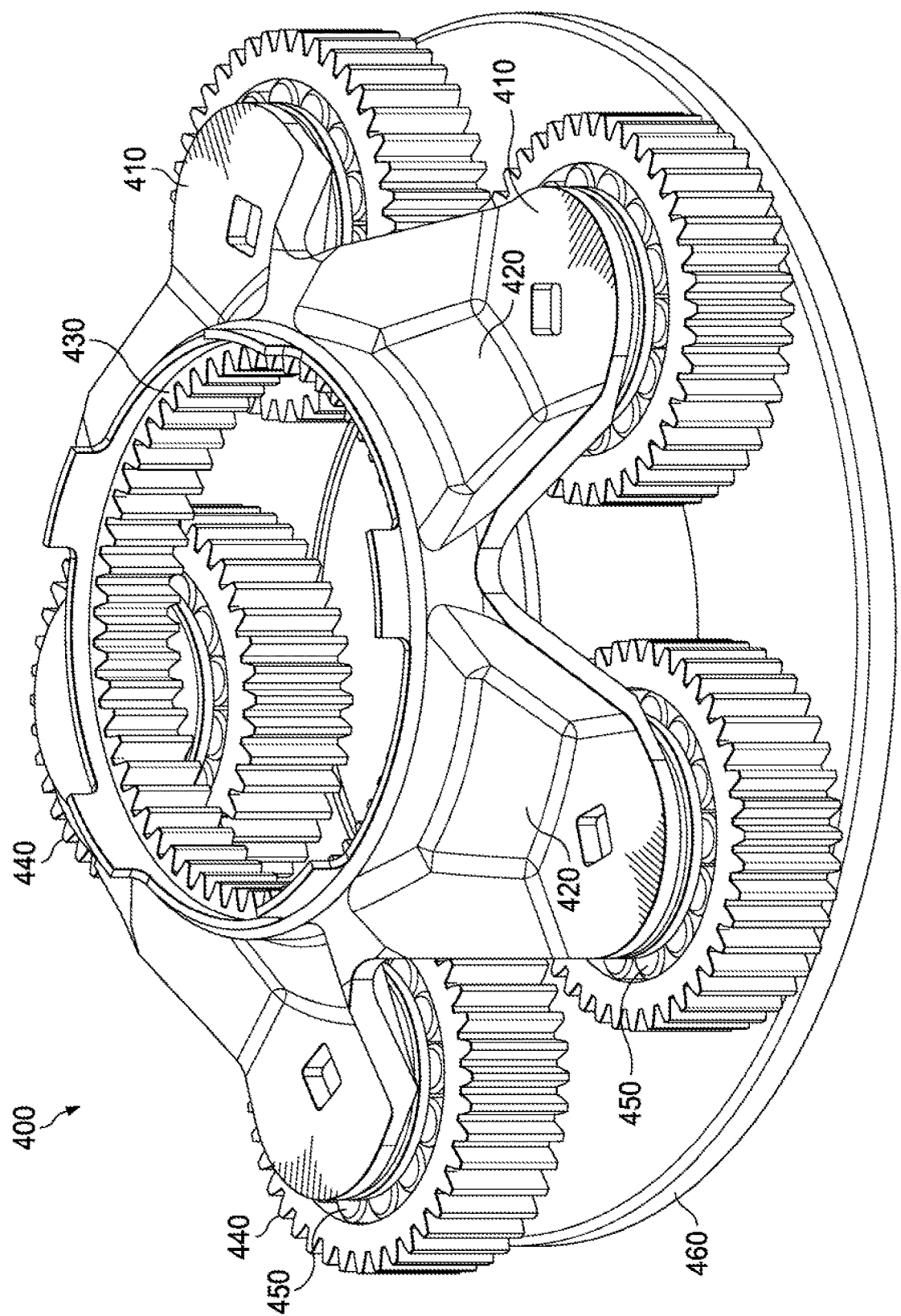
FIG. 4 is a diagram of a carrier and planetary gear system under the present disclosure.

One embodiment under the present disclosure is shown in FIG. 4. Propped cantilever system 400 comprises a hub 430 with cantilevers 420 extend outward to posts 410. Posts 410 can couple to planetary gears 440 via bearings 450 and other washers or nuts (not shown). Plate 460 is coupled to the posts 410 on the other side of planetary gears 440. Posts 410 are preferably integrated with cantilevers 420. Cantilevers 420 preferably have a scalloped structure, but un-scalloped embodiments are possible as well. FIG. 4 shows an embodiment with five cantilevers 420. Other embodiments can comprise more or fewer cantilevers 420 than the embodiment of FIG. 4.

Figure 5:
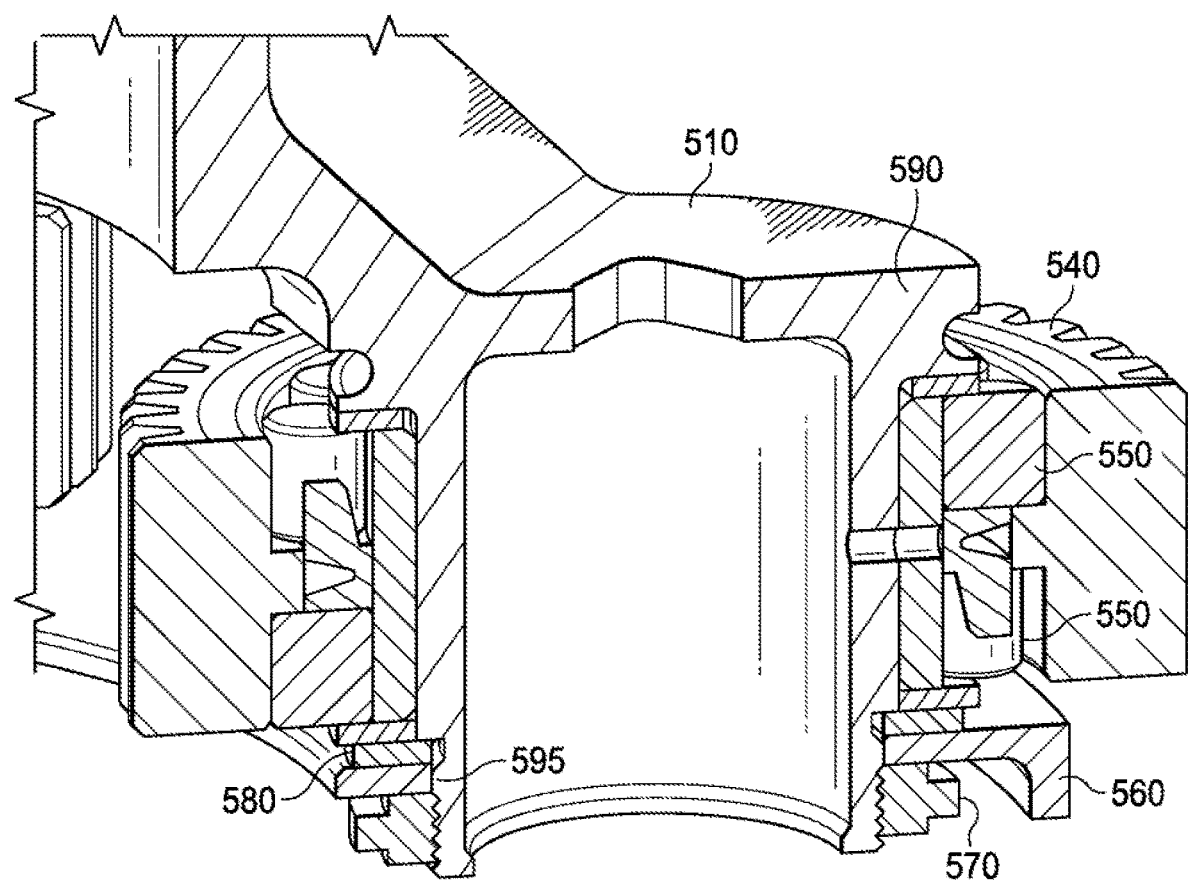
FIG. 5 is a diagram of a cut away view of a carrier under the present disclosure.

FIG. 5 shows a cut-away view of a possible embodiment of post 410 of FIG. 4. Post 510 is bearings 550 and planetary gear 540. Flange structure 590 can help hold the planetary gear 540 and bearings 550 in place from one side. Washer 580 and nut 570 can help hold the planetary gear 540 and bearings 550 in place from another side. Washers, nuts, flanges, and other structures can be used on either side to hold various components in place along post 510. Plate 560 is shown in this view between washer 580 and nut 570. Other embodiments may place these, and/or other, components in a different order along post 510. Any appropriate mechanical means may be used for placing and holding these or other components in place along post 510. Other types of bearings or planetary gears may be used. A ridge 595 may be formed in the post that can receive a portion of plate 560 and help to restrict movement of the plate 560. Other ridges can be formed to assist in holding bearings, gears, nuts, washers, or other components.

Figure 6:
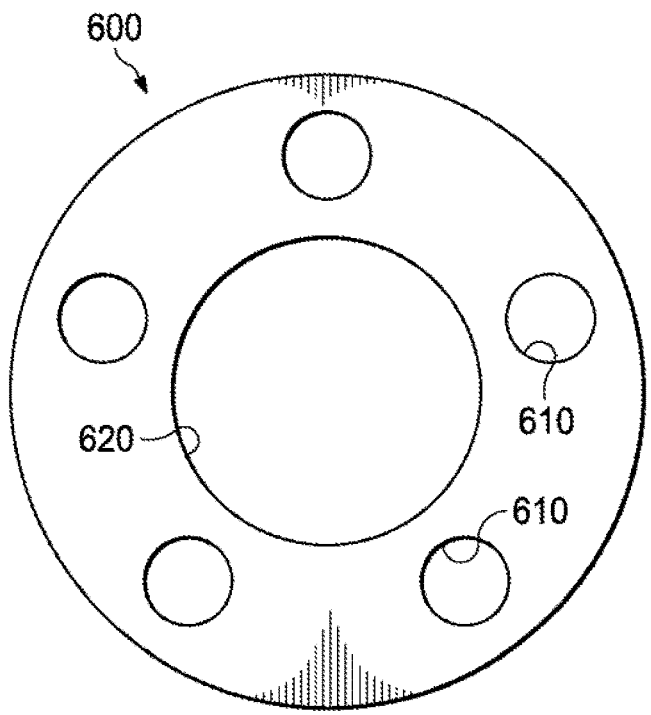
FIG. 6 is a diagram of a plate under the present disclosure.

FIG. 6 shows an embodiment of the plate 560 shown in FIG. 5. Plate 600 of FIG. 6 comprises a plurality of holes 610 that can receive a portion of the posts 510 of FIG. 5. Center hole 620 may receive other gearing, masts or other components within a gear system, transmission, or other system.

The Applicant has found that propped cantilevers, such as shown in FIGS. 4-6, combine the high strength characteristics of web-and-plate carriers with the light weight of cantilever carriers.

Figure 7:
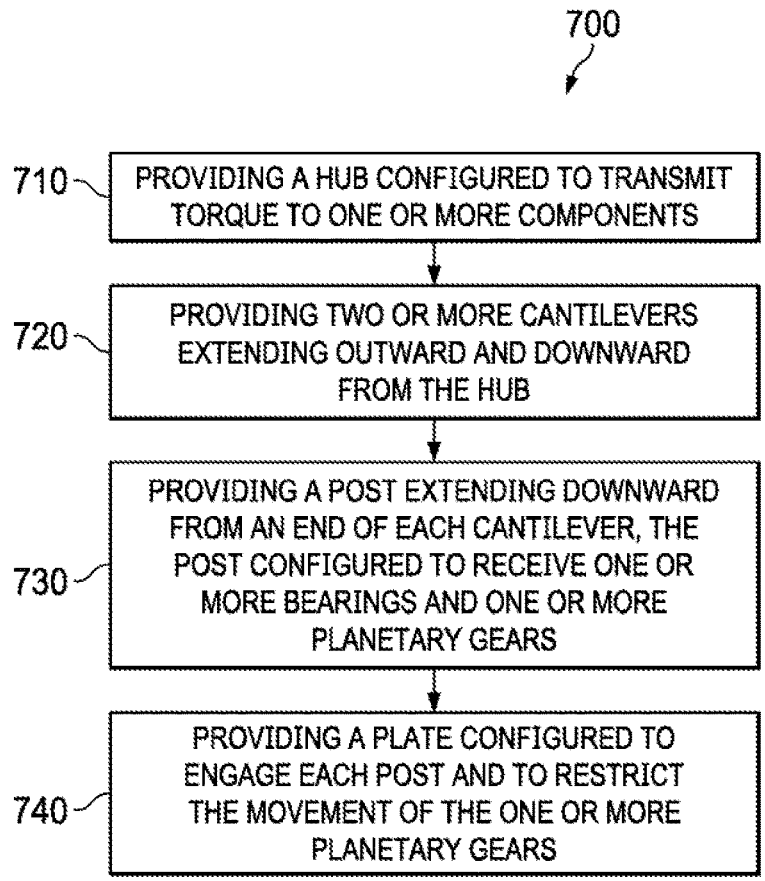
FIG. 7 is a diagram of a method embodiment under the present disclosure.

A method embodiment 700 is shown in FIG. 7. Step 710 is providing a hub configured to transmit torque to one or more components. Step 720 is providing two or more cantilevers extending outward and downward from the hub. Step 730 is providing a post extending downward from an end of each cantilever, the post configured to receive one or more bearings and one or more planetary gears. Step 740 is providing a plate configured to engage each post and to restrict the movement of the one or more planetary gears.

Propped cantilever carriers as described herein can be used in a variety of applications, both stationary and mobile. Any vehicle transmission could use some of the embodiments herein. Vehicles such as automobiles, aircraft, trucks, and more can make use of planetary gear systems, and carriers. Electric vehicles especially need to be as light weight as possible, while still attaining high strength and safety requirements. The light weight and high strength of the embodiments described here may be especially useful for electric vehicles. Toy vehicles, or other systems that use planetary gear systems may make use of the embodiments described herein. Embodiments under the present disclosure have implementations besides vehicles as well. Stationary applications, like windmills and other power generation applications, like hydropower, can comprise solutions from the present disclosure.

Carriers as described herein can often be constructed with metals. Various metal alloys are most useful in vehicle applications where loads are high. Other embodiments, such as children's toys, may make use of plastic or wood. Any material can be used that has the appropriate strength characteristics depending on the use case. It is preferred that the carrier cantilevers and posts be an integrated whole. However, in some embodiments they may comprise separate pieces that are combined through welding, soldering, glue, mechanical means, or any appropriate attachment means. The carrier and plate can comprise different materials or the same material.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A carrier for a planetary gearing system, comprising:
   a hub configured to transmit torque to a next component and comprising two or more cantilevers extending outward and downward from the hub;
   a post extending downward from each of the two or more cantilevers, the post configured to receive one or more bearings and one or more planetary gears; and
   a plate configured to couple to each post and to restrict the movement of the one or more bearings and the one or more planetary gears.

2. The carrier of claim 1, wherein each post comprises a flange configured to restrict the movement of the one or more bearings and one or more planetary gears.

3. The carrier of claim 1, wherein the two or more cantilevers are scalloped.

4. The carrier of claim 1, wherein the hub is configured to engage a mast.

5. The carrier of claim 1, wherein the carrier comprises a metal.

6. The carrier of claim 1, wherein the carrier comprises a plastic.

7. The carrier of claim 2, further comprising a washer and a nut configured to restrict the movement of the plate.

8. The carrier of claim 1 wherein each post and the two or more cantilevers are integrated.

9. A planetary gear system, comprising:
a carrier comprising:
a hub configured to transmit torque to a next component and comprising two or more cantilevers extending outward and downward from the hub;
one or more posts extending downward from the two or more cantilevers; and
a plate configured to couple the one or more posts;
one or more bearings coupled to the one or more posts; and
one or more planetary gears coupled to the one or more posts and sitting around the one or more bearings;
wherein the plate is configured to sit adjacent to the one or more planetary gears and to restrict the movement of the one or more planetary gears.

10. The planetary gear system of claim 1 wherein the planetary gear system comprises a portion of a transmission.

11. The planetary gear system of claim 1 wherein the planetary gear system comprises a part of an aircraft.

12. The planetary gear system of claim 1 wherein the planetary gear system comprises a part of an automobile.

13. The planetary gear system of claim 1 wherein the planetary gear system comprises a part of a windmill.

14. The planetary gear system of claim 1 wherein the two or more cantilevers comprise five cantilevers.

15. The planetary gear system of claim 1 wherein the two or more cantilevers comprise scalloping on a surface.

16. The planetary gear system of claim 1 further comprising one or more washers and one or more nuts configured to restrict the movement of the one or more bearings, the one or more planetary gears, and the plate.

17. A method of manufacturing a carrier for a planetary gear system, comprising:
providing a hub configured to transmit torque to one or more components;
providing two or more cantilevers extending outward and downward from the hub;
providing a post extending downward from an end of each cantilever, the post configured to receive one or more bearings and one or more planetary gears; and
providing a plate configured to engage each post and to restrict the movement of the one or more planetary gears.

18. The method of claim 17 wherein the hub, the two or more cantilevers, and each post are formed from an integrated piece of material.

19. The method of claim 17 further comprising forming a flange into each post, the flange operable to restrict the movement of the one or more planetary gears.

20. The method of claim 17 further comprising forming a ridge on each post configured to receive the plate.

* * * * *